United States Patent
Das et al.

(10) Patent No.: US 11,080,318 B2
(45) Date of Patent: *Aug. 3, 2021

(54) METHOD FOR RANKING AND SELECTING EVENTS IN MEDIA COLLECTIONS

(71) Applicant: Kodak Alaris Inc., Rochester, NY (US)

(72) Inventors: Madirakshi Das, Penfield, NY (US); Alexander C. Loui, Penfield, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,777

(22) Filed: Jun. 20, 2014

(65) Prior Publication Data

US 2015/0006523 A1  Jan. 1, 2015

Related U.S. Application Data

(60) Provisional application No. 61/840,031, filed on Jun. 27, 2013.

(51) Int. Cl.
*G06F 16/2457* (2019.01)
*G06F 16/41* (2019.01)

(52) U.S. Cl.
CPC .................................. *G06F 16/41* (2019.01)

(58) Field of Classification Search
CPC ........ G06N 3/08; H04N 21/2542; H04N 5/45; H04N 21/4332; H04N 21/466; H04N 21/4755; G06F 2201/86; G06F 2201/88; G06F 3/0482; G06F 16/24578; G06F 16/285; G06F 16/3323

USPC ............... 707/778, 829, 730, 796, 733–734, 707/748–752, 784

See application file for complete search history.

(56) References Cited

U.S. PATENT DOCUMENTS

| | | | |
|---|---|---|---|
| 6,351,556 B1 | 2/2002 | Loui | |
| 6,460,036 B1 * | 10/2002 | Herz | G06Q 30/02 707/748 |
| 6,606,411 B1 * | 8/2003 | Loui | G06F 17/3025 382/165 |
| 6,915,011 B2 | 7/2005 | Loui | |
| 7,406,436 B1 * | 7/2008 | Reisman | G06Q 30/02 705/7.32 |
| 7,831,599 B2 | 11/2010 | Das | |
| 7,860,866 B2 | 12/2010 | Kim | |
| 8,024,311 B2 | 9/2011 | Wood | |
| 8,108,408 B2 * | 1/2012 | Kondo | G06F 16/5838 707/749 |
| 8,340,436 B2 | 12/2012 | Das | |
| 8,392,430 B2 * | 3/2013 | Hua | G06F 16/58 707/748 |

(Continued)

*Primary Examiner* — Alex Gofman
*Assistant Examiner* — Linh Black
(74) *Attorney, Agent, or Firm* — Hogan Lovells US LLP

(57) ABSTRACT

A method for ranking events in media collections includes designating a media collection, using a processor to cluster the media collection items into a hierarchical event structure, using the processor to identify and count visually similar sub-events within each event in the hierarchical event structure, using the processor to determine a ranking of events based on the count of sub-events within each event, and associating the determined ranking with each event in the media collection.

15 Claims, 6 Drawing Sheets

(56) References Cited

U.S. PATENT DOCUMENTS

| | | | | |
|---|---|---|---|---|
| 8,429,026 | B1* | 4/2013 | Kolawa | G06Q 30/00 705/26.7 |
| 8,718,386 | B2* | 5/2014 | Das | H04N 5/2251 382/172 |
| 2004/0208377 | A1* | 10/2004 | Loui | G06K 9/0063 382/224 |
| 2006/0104520 | A1* | 5/2006 | Kraus | G06F 17/30265 382/225 |
| 2006/0271526 | A1* | 11/2006 | Charnock | G06Q 30/02 |
| 2007/0100563 | A1* | 5/2007 | Webb | G06F 19/20 702/20 |
| 2007/0127783 | A1* | 6/2007 | Kuramoto | H04N 1/62 382/115 |
| 2008/0205772 | A1* | 8/2008 | Blose | G06F 17/3028 382/225 |
| 2009/0094518 | A1* | 4/2009 | Lawther | G06F 3/04817 715/716 |
| 2009/0109298 | A1* | 4/2009 | Wan | G06K 9/00711 348/222.1 |
| 2009/0148071 | A1* | 6/2009 | Ohwa | G11B 27/105 382/306 |
| 2009/0161962 | A1* | 6/2009 | Gallagher | G06F 17/30247 382/203 |
| 2009/0319560 | A1* | 12/2009 | Cheng | G06F 17/30781 |
| 2010/0070448 | A1* | 3/2010 | Omoigui | H01L 27/1463 706/47 |
| 2010/0124378 | A1 | 5/2010 | Das | |
| 2011/0213655 | A1* | 9/2011 | Henkin | G06Q 30/0251 705/14.49 |
| 2011/0317982 | A1* | 12/2011 | Xu | G06K 9/00765 386/241 |
| 2012/0014560 | A1* | 1/2012 | Obrador | G06K 9/00677 382/103 |
| 2012/0143921 | A1* | 6/2012 | Wilson | G06Q 50/01 707/798 |
| 2012/0191716 | A1* | 7/2012 | Omoigui | H01L 27/1463 707/740 |
| 2012/0210229 | A1* | 8/2012 | Bryant | H04N 9/73 715/723 |
| 2013/0054620 | A1* | 2/2013 | Stokes | G06F 16/56 707/749 |
| 2013/0230230 | A1* | 9/2013 | Ajemba | G06T 7/0012 382/133 |
| 2014/0002342 | A1* | 1/2014 | Fedorovskaya | G06Q 30/0271 345/156 |
| 2014/0365506 | A1* | 12/2014 | Gong | G06F 16/784 707/748 |
| 2015/0169641 | A1* | 6/2015 | Alldrin | G06K 9/00664 707/750 |

* cited by examiner

METHOD FOR RANKING AND SELECTING EVENTS IN MEDIA COLLECTIONS

RELATED CASE INFORMATION

The present application is related to co-pending patent application Ser. No. 14/310,799, entitled "SYSTEM FOR RANKING AND SELECTING EVENTS IN MEDIA COLLECTIONS", which is hereby incorporated in their entirety by this reference.

FIELD OF THE INVENTION

The invention relates generally to the field of digital image processing, and in particular to methods and systems for ranking and selecting events in consumer media collections.

BACKGROUND OF THE INVENTION

The proliferation of digital cameras and scanners has lead to an explosion of digital images, creating large personal image databases. Since taking digital pictures is easy and practically free, consumers no longer restrict picture-taking to important events and special occasions. Images are being captured frequently, and of day-to-day occurrences in the consumers' life. Since a typical user has already accumulated many years of digital images, browsing the collection to find images taken during important events is a time-consuming process for the consumer.

There has been work in grouping images into events. U.S. Pat. No. 6,606,411, assigned to A. Loui and E. Pavie, entitled "A method for automatically classifying images into events," issued Aug. 12, 2003 and U.S. Pat. No. 6,351,556, assigned to A. Loui, and E. Pavie, entitled "A method for automatically comparing content of images for classification into events," issued Feb. 26, 2002, disclose algorithms for clustering image content by temporal events and sub-events. According to U.S. Pat. No. 6,606,411 events have consistent color distributions, and therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Another method of automatically organizing images into events is disclosed in U.S. Pat. No. 6,915,011, assigned to A. Loui, M. Jeanson, and Z. Sun, entitled "Event clustering of images using foreground and background segmentation" issued Jul. 5, 2005. The events detected are chronologically ordered in a timeline from earliest to latest.

Using the above methods, it is possible to reduce the amount of browsing required by the user to locate a particular event by viewing representatives of the events along a timeline, instead of each image thumbnail. However, a typical user may still generate hundreds of such events over a few year period, and more prolific picture-takers can easily exceed a few thousands detected events. It will be a very tedious task for the user to browse through their collection to pick various events or sub-events to create a photo product such as a collage or photobook. Hence, there is a need for new methods and systems to automatically rank the events and to select the preferred set of events based on some relevant criteria. In addition, the present invention also teaches how to select events from the ranked list of events based on a calculated target distribution, which can be computed using the distribution of one or more event attributes of the events derived from the media collection. Further, event ranking and selection can also be tied to social networks, where different user input such as tags and comments, will be used for aid in the ranking and selection.

There has been other work in event clustering using metadata. U.S. Pat. No. 7,860,866, assigned to Kim el at., entitled "Heuristic event clustering of media using metadata," issued Dec. 28, 2010, discloses algorithms for clustering an media collection into event based on time difference and location difference between consecutive media files. However the above patent does not teach how to rank or select event from a media collection, which is the main idea in the present invention. The '866 patent only teaches how to cluster media files into separate events with no ranking information. There also has been work in identifying media assets using contextual information. U.S. Pat. No. 8,024,311, assigned to Wood and Hibino, entitled "Identifying media assets from contextual information," issued on Sep. 20, 2011, discloses a method to select media assets by identifying an event using the received contextual information such as text data, gesture data, or audio data. The above patent clearly depends on a user to first provide some contextual information as input before it can identify the appropriate event, and the subsequent selection of the media assets. This is a different application as it requires user input and direction, whereas the present invention teaches how to automatically rank and select events without user input. Further, the '311 patent only identify one event (see FIG. 2) based on the input contextual information, whereas the present invention will provide a rank for each of the events in the collection.

Advantages of the Present Invention

The organization and retrieval of images and videos is a problem for the typical consumer. It is useful for the user to be able to browse an overview of important events in their collection. Technology disclosed in prior art allows the classification of images in a collection into events, but not the ability to ascertain the importance or ranking of such events. As a result, these include uninteresting or common day-to-day events that inflate the number of events to the point where it is difficult to find more important events even when browsing a list of events. This invention teaches a method and system for automatically ranking events that have been detected from a media collection. In addition, it also discloses how to select events from a ranked list of events based on a calculated target distribution, which can be computed using the distribution of one or more event attributes of the events derived from the media collection.

SUMMARY OF THE INVENTION

In accordance with the present invention, there is provided a method and system for ranking events in media collections comprising designating a media collection, using a processor to cluster the media collection items into a hierarchical event structure, using the processor to identify and count visually similar sub-events within each event in the hierarchical event structure, using the processor to determine a ranking of events based on the count of sub-events within each event, and associating the determined ranking with each event in the media collection.

In another embodiment of the present invent, there is provide a method for selecting events from media collections comprising designating a media collection, using a processor to cluster the media collection items into a hierarchical event structure, using the processor to identify and count visually similar sub-events within each event in the hierarchical event structure, using the processor to determine a ranked list of events based on the count of sub-events within each event, using the processor to calculate a target distribution that is based on the distribution of one or more event attributes of the events derived from the media collection, and selecting events from the ranked list of events based on the calculated target distribution.

DETAILED DESCRIPTION OF THE INVENTION

The present invention can be implemented in computer systems as will be well known to those skilled in the art. In the following description, some embodiments of the present invention will be described as software programs. Those skilled in the art will readily recognize that the equivalent of such a method may also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts. Videos in a collection are included in the term "images" in the rest of the description.

Figure 1:
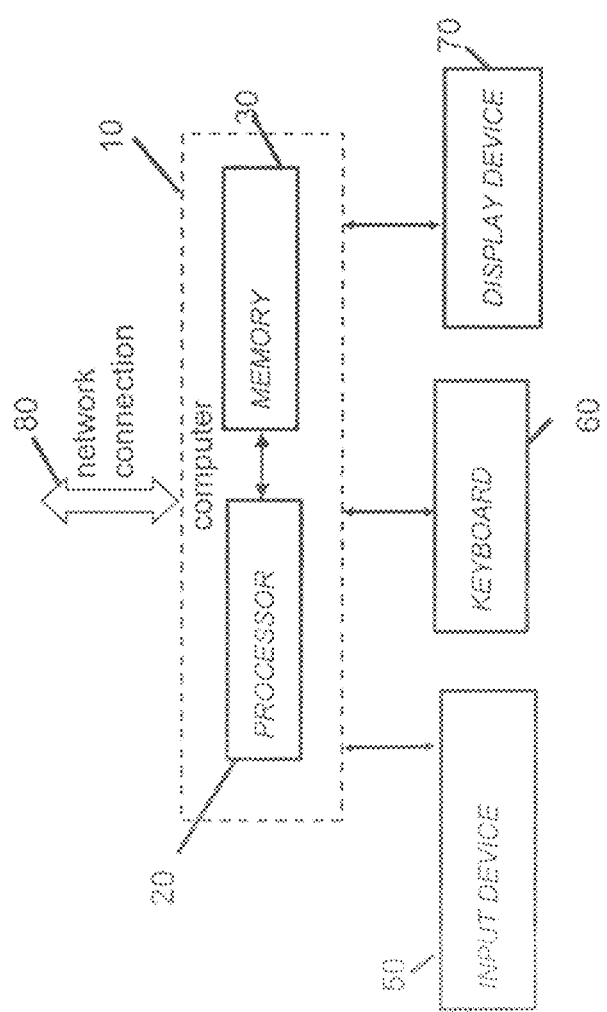
FIG. 1 is a block diagram of a system that practices the present invention.

The present invention can be implemented in computer hardware and computerized equipment. For example, the method can be performed in a digital camera, a multimedia smart phone, a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, home computers, kiosks, or any other system for the processing of digital images. The computer 10 includes a microprocessor-based unit 20 (also referred to herein as a processor) for receiving and processing software programs and for performing other processing functions. A memory unit 30 stores user-supplied and computer-generated data which may be accessed by the processor 20 when running a computer program. A display device (such as a monitor) 70 is electrically connected to the computer 10 for displaying information and data associated with the software, e.g., by means of a graphical user interface. A keyboard 60 is also connected to the computer. As an alternative to using the keyboard 60 for input, a mouse can be used for moving a selector on the display device 70 and for selecting an item on which the selector overlays, as is well known in the art. Input devices 50 such as compact disks (CD) and DVDs can be inserted into the computer 10 for inputting the software programs and other information to the computer 10 and the processor 20. Still further, the computer 10 can be programmed, as is well known in the art, for storing the software program internally. In addition, media files (such as images, music and videos) can be transferred to the memory 30 of the computer 10 by means of input devices 50 such as memory cards, thumb drives, CDs and DVDs, or by connecting a capture device (such as camera, cell phone, video recorder) directly to the computer 10 as an input device. The computer 10 can have a network connection, such as a telephone line or wireless connection 80, to an external network, such as a local area network or the Internet. Software programs and media files can be transferred to the computer from other computers or the Internet through the network connection.

It should also be noted that the present invention can be implemented in a combination of software or hardware and is not limited to devices which are physically connected or located within the same physical location. One or more of the devices illustrated in FIG. 1 can be located remotely and can be connected via a network. One or more of the devices can be connected wirelessly, such as by a radio-frequency link, either directly or via a network.

Figure 2:
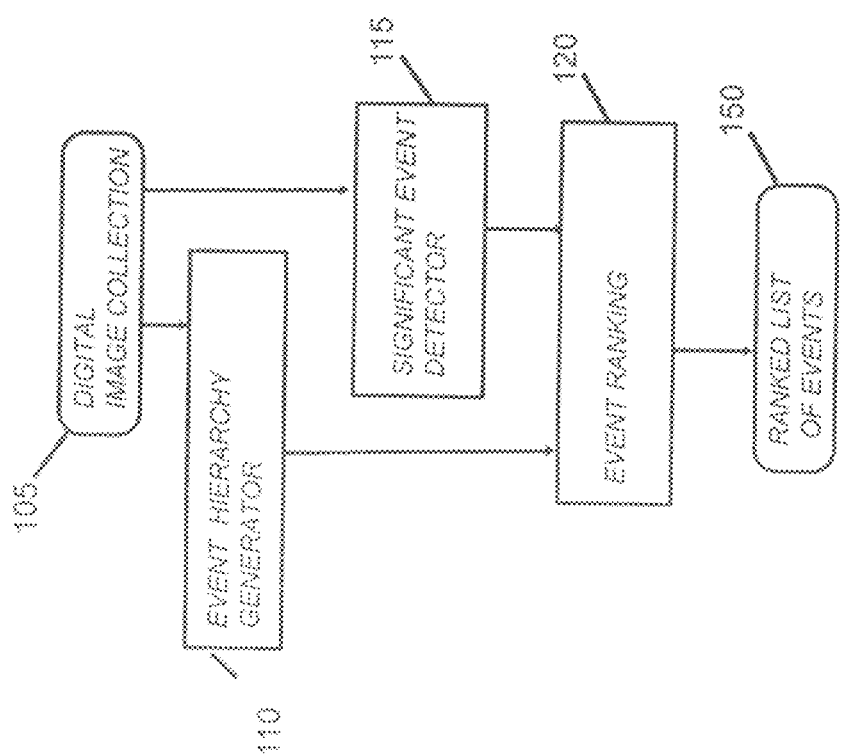
FIG. 2 is an overall flowchart of the method practiced by system shown in FIG. 1.

Referring to FIG. 2, a user's digital image collection 105 resides in the memory 30 of a computer 10. The other blocks in the figure are implemented by a software program and are executed by the processor 20 of the computer 10. FIG. 2 shows the overall workflow of an aspect of the present invention and each component module will be described in detail below.

Referring to FIG. 2, a user's digital image collection 105 is grouped into an event representation by the event hierarchy generator 110. Commonly assigned U.S. Pat. Nos. 6,606,411 and 6,351,556 disclose algorithms for clustering image content by temporal events and sub-events, the disclosures of which are incorporated herein. According to U.S. Pat. No. 6,606,411 events have consistent color distributions, and therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Briefly summarized, a collection of images is classified into one or more events determining one or more largest time differences of the collection of images based on time and/or date clustering of the images and separating the plurality of images into the events based on having one or more boundaries between events where one or more boundaries correspond to the one or more largest time differences. For each event, sub-events can be determined (if any) by comparing the color histogram information of successive images as described in U.S. Pat. No. 6,351,556. This is accomplished by dividing an image into a number of blocks and then computing the color histogram for each of the blocks. A block-based histogram correlation procedure is used as described in U.S. Pat. No. 6,351,556 to detect sub-event boundaries. Another method of automatically organizing images into events is disclosed in commonly assigned U.S. Pat. No. 6,915,011, which is herein incorporated by reference.

The events detected continue to be chronologically ordered in a timeline from earliest to latest. Using the method described above, it is not possible to detect single events that span a long period of time (days) and encompass a variety of activities and settings (for example, a long vacation covering multiple destinations) or events that occur in distinct parts separated by some hours from each other (for example, a sporting event with many matches or a wedding). Gaps in photo-taking corresponding to the overnight period also cause breaks in event continuity. Further processing is needed to detect these super-events, defined as a grouping of multiple contiguous events that may span multiple days. Inter-event duration, defined as the time duration between the last image of one event and the first image of the next event on a continuous timeline, is computed for each event. The events are then treated as single points on a time axis, separated by the inter-event durations. A density-based clustering method is applied to these points (ref. Data Mining Concepts and Techniques by Han and Kamber, Elsevier, 2006, supra, pp. 418-420) to cluster events into super-events when they are separated by relatively small duration gaps (for example, less than 18 hours). The final three-level hierarchical event representation includes super-events, events and sub-events. After this point, the term "event" refers to the top-level of the hierarchical event representation--which can be a super-event or an event. Referring to FIG. 2, the digital image collection 105 is grouped into temporal events, sub-events and super-events using the methods described above.

Referring to FIG. 2, significant events are detected in step 115 from the digital image collection 105. A significant event detection algorithm using time-series analysis of the capture date/time information of the images is used to detect the significant events. The details of the algorithm can be found in U.S. Pat. No. 8,340,436, "Detecting significant events in consumer image collections," by Das and Loui, issued on Dec. 25, 2012, the disclosure of which is incorporated herein by reference. In U.S. Pat. No. 8,340,436, the predicted output of the selected ARIMA model is compared with the image counts time-series that was used to generate the model. Residuals are computed as the difference between the predicted output of the model and the image counts time-series at each time step. The variance ($\sigma$) of the residuals is computed and a threshold is determined based on this variance. Here, we compute an additional significance score defined as the residual divided by the variance ($\sigma$).

Referring to FIG. 2, the output of the event hierarchy generator 110 and the significant event detector 115 are fed into the event ranking module 120. The events can be ranked by a number of different criteria.

In one aspect of the present invention, the number of sub-events in the event is used to rank events in descending order of importance. Since each sub-event extracted using the method disclosed in U.S. Pat. No. 6,606,411 has consistent color distribution as determined by block-level color histogram similarity; more sub-events in an event indicates that these pictures are likely to have been taken with diverse backgrounds that increase the scope of the event. This justifies a higher ranking when there are more sub-events. In another embodiment, the significance score, defined as the residual divided by the variance ($\sigma$), is used to rank the events, with a higher score getting a higher rank. The significance score generated at the end of the significant event detection described earlier indicates how well the event fits into the estimated model, with a higher score indicating a lower fit, and therefore, the event is more likely to be something unusual and important in the collection.

Figure 4:
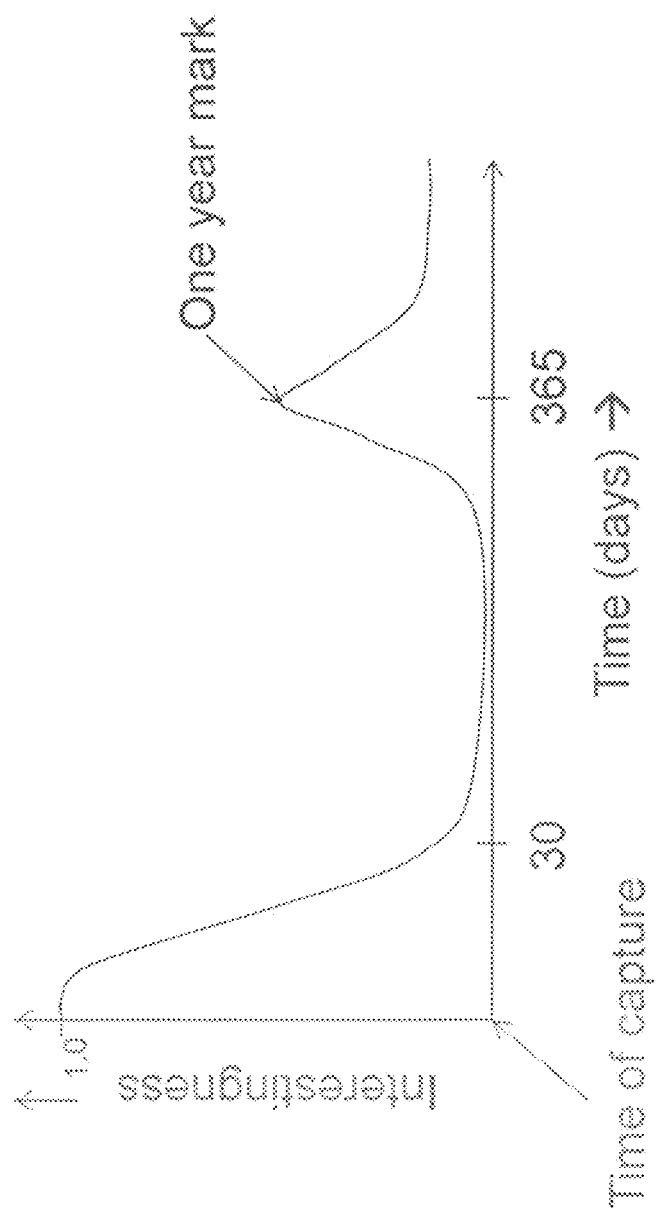
FIG. 4 shows a model for interestingness of an image according to an aspect of the present invention.

In another aspect of the present invention, the interestingness of an event can be modeled as shown in FIG. 4. As represented in FIG. 4, the interestingness score of an event is initially high (close to 1.0) at the time of capture (start time of the event), and then falls rapidly as the first month passes by. The interestingness score again rises around the picture's one-year anniversary mark (because people are often interested in reliving the previous year's happenings, especially if the event is an annual recurring event such as a birthday). The interestingness score then plateaus to a higher level than the first year, and at each subsequent anniversary achieves a slightly higher level than the previous year. The events are ranked according to their interestingness score.

In another aspect of the present invention, the albums of images a user uploads for sharing to social networks are gathered, along with social interactions such as "likes", comments, and tags associated with each image. The images in these albums are treated as a set of images that have no capture date-time information, but are in a list arranged by the time of upload. This list of images is merged into a user's personal image collection that resides on their private storage (which can be on a personal computer, mobile device or online storage) using the method described in U.S. Pat. No. 7,831,599 "Additive clustering of images lacking individualized date-time information" by Das et al issued Sep. 11, 2010. This patent describes a method that uses a dynamic programming-based formulation to merge images lacking capture time into an organized collection where events have already been computed and capture date-time information exists. The method computes image similarity scores based on image content, and ensures that the ordering of the incoming list of images is maintained. After merging the shared images into the user's personal collection, the number of social interactions ("likes", comments and tags) derived from the shared images are counted for each event in the user collection that contains shared images from the merging process. The events are ranked in decreasing order of number of social interactions.

In another aspect of the present invention, the number of images that are marked by the user is counted for each event, and the events are ranked in decreasing order of the number of user markings, The user markings can take different forms including being marked a "favorite" either at time of capture on the capture device itself, or later on the site of storage (computer or online storage); marked as to be used for sharing; or marked with a star rating system provided by the capture device or storage site with the maximum star rating allowed.

Figure 3:
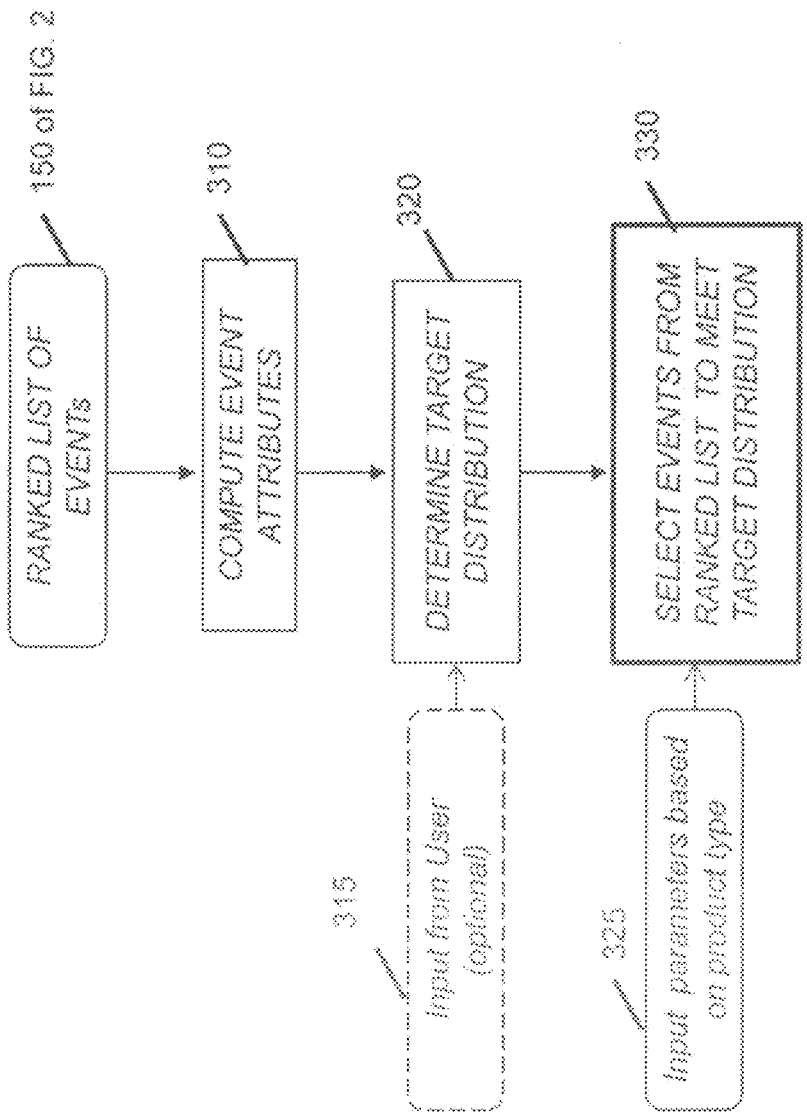
FIG. 3 shows the method for selecting events from a ranked list of events according to an aspect of the present invention.

Referring to FIG. 3, steps 310-330 refer to additional steps performed with the ranked list of events (step 150 of FIG. 2) to select events from the ranked list. One or more event attributes 310 are computed for each of the events on the ranked list. The event attributes that can be computed include event class, event size, and media type of the event. Event class refers to the classification of the event into one of a finite set of event classes e.g., vacation, party, sports and family moments. A method for event classification is described in US Patent application US 2010/0124378A1 titled "Method for event-based semantic classification". In this method, a classifier is trained to recognize events of different pre-specified classes.

Event size refers to the number of assets (images or video) contained in the top-level event (i.e., a super-event or an event). The media type of an event refers to the ratio of videos to images in the event, discretized into a pre-specified number of bins. The media type indicates the mix of video and images in an event.

Referring to FIG. 3, step 320 determines a target distribution of the selected event attribute. The target distribution is initially computed to match the distribution of the attribute in the collection. For this purpose, a histogram is generated where each bin represents a category of the selected event attribute, and the value of the bin is the count of events in the collection with that category. The histogram is then normalized (each bin count is divided by the total number of events in the collection) so that the values are between 0.0 and 1.0. This normalized histogram represents the target distribution 320. As an optional step, input from the user 315 can be incorporated to alter the target distribution at this point. For example, if the user prefers a selection representing vacations in the collection, the target distribution of the event class attribute is altered so that the "vacation" class is set to 1.0 and the rest of the classes are set to 0.0. The user input does not need to be binary—an interface could be provided that allows the user to indicate interest in a sliding scale e.g., more vacations, less sports, and these can be translated into corresponding changes in the target distribution.

Referring to FIG. 3, step 330 selects events from the ranked list in descending order while maintaining the target distribution. The output product type e.g., photobook, calendar or collage, determines the number (typically not an exact number, but a range) of images needed to create the output product type. The user (or system in case of an auto-generated product) may also provide a sub-set of the whole collection to select from, where the sub-set may be specified by a time range, selected folders or a selection set (default is the whole collection). It is assumed that selecting a fraction of the images in an event provides sufficient representation for the event in an output product. The fraction is based on the type of output product (e.g. calendars may use fewer images than photobooks for the same event). In one embodiment, the fraction is chosen to be 0.1 (i.e., 10% of the images from an event are typically expected to be used in the product). This output product-based requirement for the number of images, fraction of images from an event, and selected sub-set is provided in step 325 as input parameters to the selection step 330.

Figure 5:
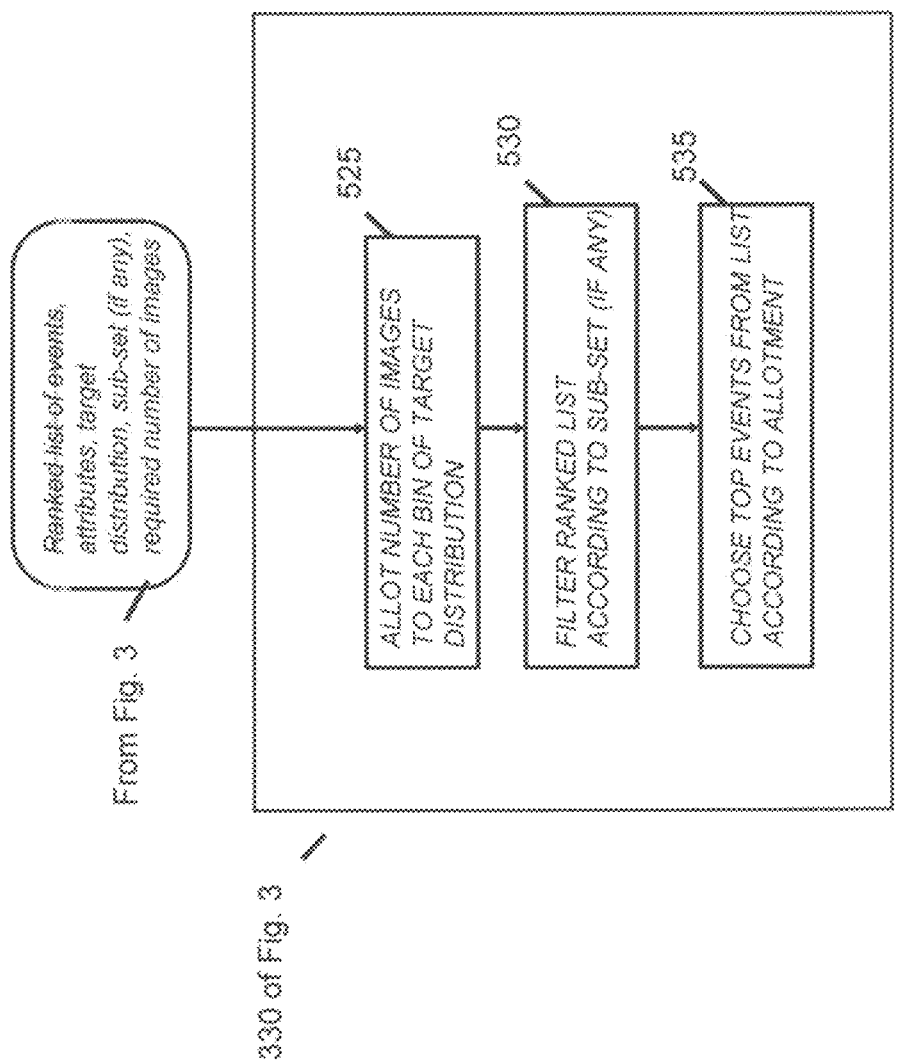
FIG. 5 shows additional detail for Step 330 of FIG. 3.

Referring to FIG. 5, the number of images needed (or the number in the center of the range, if a range is provided) is used to proportionally allot number of images according to the target distribution 525. e.g. if the target distribution is based on the event class, the bin value is 0.3 for the "party" class, and 120 images are needed, then 0.3×120=36 images are allotted for images from the "party" event class. This is a rough estimate and need not be accurate, as the product generation system (with or without manual selection by user) can select more or less from any event. The ranked list is filtered 530 by the selected sub-set e.g. if a time range is specified, only events in that time range are retained in the list, and the others are eliminated. The events are selected in step 535 that is shown in detail in FIG. 6.

Figure 6:
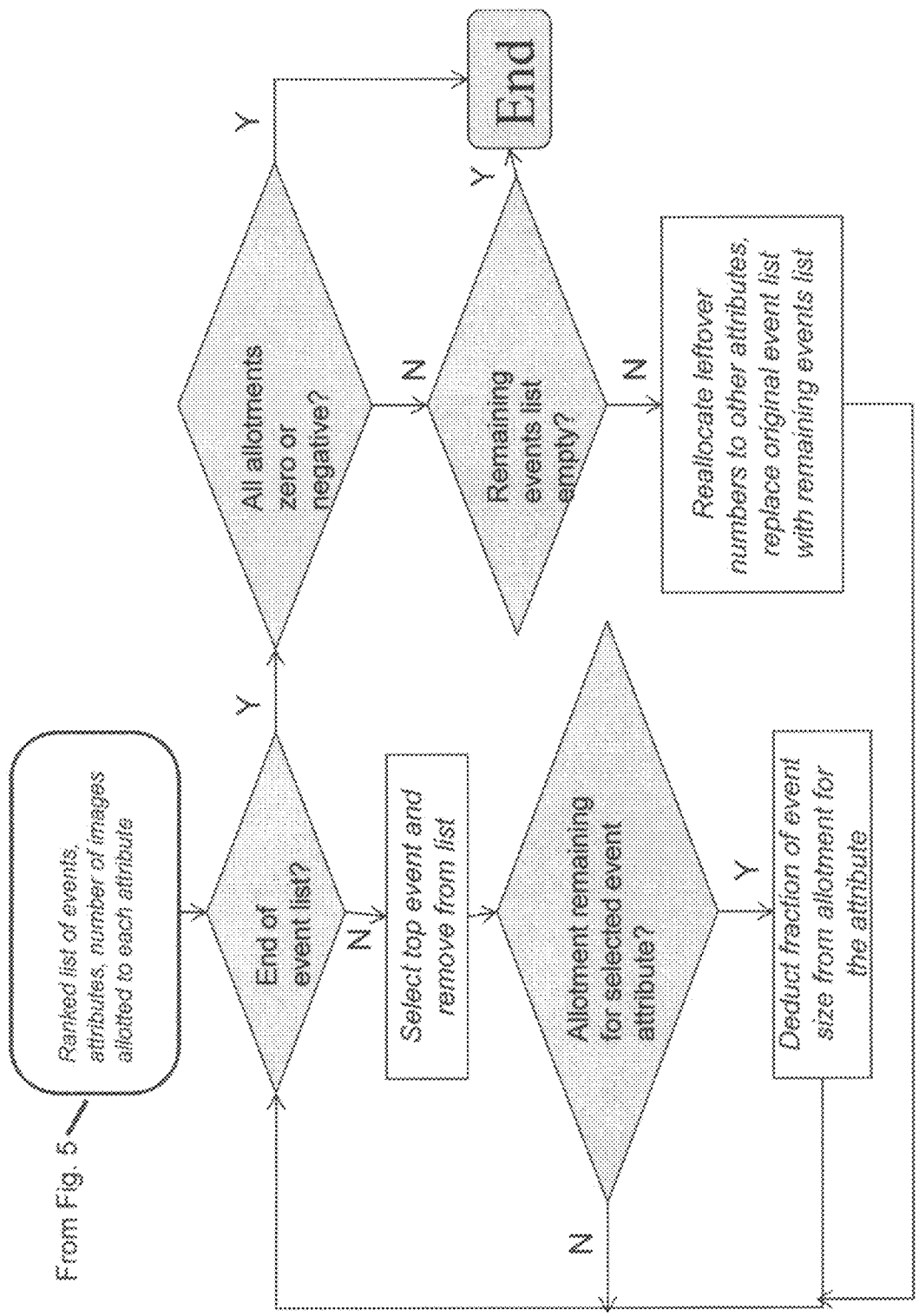
FIG. 6 shows additional detail for Step 535 of FIG. 5.

Referring to FIG. 6, traversing the filtered, ranked event list in descending order, each event encountered in the list is selected if the number of remaining images allotted to that event type is greater than zero. After adding the event, the number of allotted images for that event attribute is decreased by the product of the given fraction and the event size. The process is continued till there is no positive number of remaining images for any event attribute or when the list is exhausted (without meeting all the allotments). In the latter instance, a second pass is performed through the remaining events in the list, after re-allotting the event types that did not have enough candidates, to other event types in proportion to the target distribution values for those event types. This process is continued till either the remaining allotments are all negative, or when there are no events left in the list.

A method for ranking events in media collections comprises designating a media collection, using a processor to cluster the media collection items into a hierarchical event structure, using the processor to identify and count visually similar sub-events within each event in the hierarchical event structure, using the processor to determine a ranking of events based on the count of sub-events within each event, and associating the determined ranking with each event in the media collection.

The ranking of events can be based on the significance score of the event, on a distribution that models the importance of an event over an elapsed time period, on a score or distribution that models the interestingness of an event over an elapsed time period, on metadata from social networks such as number of likes and comments, on metadata from social networks through the analysis of user tags and comments, or on the number of images in the event that have been marked by the user as being a favorite or to be used for sharing.

A method for selecting events from media collections comprises designating a media collection, using a processor to cluster the media collection items into a hierarchical event structure, using the processor to identify and count visually similar sub-events within each event in the hierarchical event structure, using the processor to determine a ranked list of events based on the count of sub-events within each event, using the processor to calculate a target distribution that is based on the distribution of one or more event attributes of the events derived from the media collection, and selecting events from the ranked list of events based on the calculated target distribution.

The event attribute used in the target distribution can be the event class, the event size, or the media type of the event. The ranking of events is based on the significance score of the event, on a distribution that models the importance of an event over an elapsed time period, on scores or a distribution that models the interestingness of an event over an elapsed time period, on metadata from social networks such as number of likes and comments, on metadata from social networks through the analysis of user tags and comments, or on the number of images in the event that have been marked by the user as being a favorite or to be used for sharing.

A system for ranking events in media collections comprises a processor-accessible memory for storing a media collection, and a processor for clustering the media collection items into a hierarchical event structure, for identifying and visually counting similar sub-events within each event in the hierarchical event structure, for determining a ranking of events based on the count of sub-events within each event, and for associating the determined ranking with each event in the media collection.

A system for selecting events from media collections comprises a processor-accessible memory for storing a media collection and a processor for clustering the media collection items into a hierarchical event structure, for identifying and visually counting similar sub-events within each event in the hierarchical event structure, for determining a ranked list of events based on the count of sub-events within each event, for calculating a target distribution based on the distribution of one or more event attributes of the events derived from the media collection, and for selecting events from the ranked list of events based on the calculated target distribution.

The invention has been described in detail with particular reference to certain preferred embodiments thereof, but it will be understood that variations and modifications can be effected within the spirit and scope of the invention.

PARTS LIST

10 Computer
20 Processor
30 Memory
50 Input device
60 Keyboard
70 Display Device
80 Network connection
105 Digital image collection
110 Time-series generator
115 Time-series modeling step
120 Significant event detector
205 Extract date/time step
215 Accumulators for different time units
225 Group of image counts time-series
305 Image counts time-series
310 Estimate initial parameters step
315 Fit ARIMA models step
320 Choose viable models step
325 Compute goodness-of-fit measures step
330 Choose best ARIMA model step
405 Image counts time-series
410 ARIMA model
415 Compute residuals step
420 Determine threshold step
430 Identify time steps of interest step
440 Identify significant events step
510 Significant events
520 Additional inputs
530 Time granularity selector

The invention claimed is:

1. A method for ranking events in media collections, performed at a device having one or more processors and a processor-accessible memory, the method comprising:
designating a media collection stored on the processor-accessible memory, wherein the media collection comprises a plurality of media collection items, and wherein the media collection items capture a plurality of events;
clustering the media collection items into a hierarchical event structure, wherein the hierarchical event structure comprises events and sub-events;
identifying visually similar sub-events within each event in the hierarchical event structure, wherein the visually similar sub-events have consistent color distribution and are identified by block-level color histogram similarity;
ranking the events in descending order of importance based on a count of most to fewest visually similar sub-events within each event;
identifying a plurality of event attributes present in the ranked events;
receiving a selection from a user of a preferred event attribute;
determining a threshold target distribution of the preferred event attribute, wherein determining the threshold target distribution comprises generating a normalized histogram having a plurality of bins, wherein each bin represents a category of the preferred event attribute;
selecting a subset of ranked events that combined meet or exceed the threshold target distribution of the preferred event attribute;
selecting a first event from the subset of ranked events with a highest ranking of importance;
selecting media collection items that capture the selected first event, wherein the number of media collection items selected is based on the threshold target distribution of the preferred event attribute;
selecting a second event from the subset of ranked events;
selecting media collection items that capture the selected second event, wherein the number of media collection items selected is based on the threshold target distribution of the preferred event attribute; and
fulfilling an output product with the selected media collection items.

2. The method of claim 1, wherein ranking the events is also based on a significance score of the event.

3. The method of claim 1, wherein ranking the events is also based on a distribution that models importance of an event over an elapsed time period.

4. The method of claim 1, wherein ranking the events is also based on a score or distribution that models interestingness of an event over an elapsed period of time.

5. The method of claim 1, wherein ranking the events is also based on metadata from social networks.

6. The method of claim 1, wherein ranking the events is also based on metadata from social networks through analyzing user tags and comments.

7. The method of claim 1, wherein ranking the events is also based on the media collection items capturing the events that have been marked by a user as being a favorite or to be used for sharing.

8. A method for selecting events from media collections, comprising:
designating a media collection, wherein the media collection comprises a plurality of images;
using a processor to cluster the media collection items into a hierarchical event structure, wherein the hierarchical event structure comprises events and sub-events;
using the processor to identify and count visually similar sub-events within each event in the hierarchical event structure, wherein the visually similar sub-events have consistent color distribution and are identified by block-level color histogram similarity;
using the processor to determine a ranked list of the events in the hierarchical event structure, wherein the ranked list prioritizes the events from highest interestingness score to lowest interestingness score, wherein interestingness score is determined based on time elapsed since each of the events in the hierarchical event structure;
receiving a selection from a user of a preferred event attribute;
using the processor to calculate a threshold target distribution of the preferred event attribute, wherein calculating the threshold target distribution comprises generating a normalized histogram having a plurality of bins, wherein each bin represents a category of the preferred event attribute;

selecting a subset of ranked events that combined meet or exceed the threshold target distribution of the preferred event attribute;

selecting a first event from the subset of ranked events with a highest interestingness score ranking;

selecting images from the media collection that capture the selected first event, wherein the number of images selected is based on the threshold target distribution of the preferred event attribute;

selecting a second event from the subset of ranked events;

selecting images from the media collection that capture the selected second event, wherein the number of images selected is based on the threshold target distribution of the preferred event attribute; and using the processor to incorporate the selected images from the media collection into an output product.

9. The method of claim 8, wherein the preferred event attribute is event class.

10. The method of claim 8, wherein the preferred event attribute is event size.

11. The method of claim 8, wherein the preferred event attribute is media type of the event.

12. The method of claim 8, wherein determining the ranked list of events is based on a significance score of each event.

13. The method of claim 8, wherein determining the ranked list of events is based on metadata from social networks.

14. The method of claim 8, wherein determining the ranked list of events is based on metadata from social networks through analyzing user tags and comments.

15. The method of claim 8, wherein determining the ranked list of events is based on a number of images capturing the event that have been marked by a user as being a favorite or to be used for sharing.

* * * * *